US008594670B2

(12) United States Patent
Chin et al.

(10) Patent No.: US 8,594,670 B2
(45) Date of Patent: Nov. 26, 2013

(54) MEASUREMENT AND HANDOVER OF DUAL USIM MOBILE TERMINAL

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 13/151,596

(22) Filed: Jun. 2, 2011

(65) Prior Publication Data

US 2012/0021744 A1 Jan. 26, 2012

Related U.S. Application Data

(60) Provisional application No. 61/366,471, filed on Jul. 21, 2010.

(51) Int. Cl.
*H04W 36/00* (2009.01)
*H04M 1/00* (2006.01)

(52) U.S. Cl.
USPC ...... 455/436; 455/558; 455/552.1; 455/553.1

(58) Field of Classification Search
USPC .............. 455/436–453, 552.1, 553.1, 558
See application file for complete search history.

(56) References Cited

U.S. PATENT DOCUMENTS 5,764,730 A * 6/1998 Rabe et al. .................... 455/403
8,406,741 B2 * 3/2013 Kang et al. ................. 455/412.1
2008/0293394 A1 * 11/2008 Silver et al. .................... 455/417
2009/0131054 A1 * 5/2009 Zhang .......................... 455/436
2010/0202551 A1 * 8/2010 Webster et al. ............... 375/260
2010/0238799 A1 * 9/2010 Sebire ......................... 370/225
2010/0279698 A1 * 11/2010 Wong ........................... 455/450
2011/0195749 A1 * 8/2011 Lan ............................. 455/558
2012/0135715 A1 * 5/2012 Kang et al. ................ 455/412.1

FOREIGN PATENT DOCUMENTS

EP 2190247 A2 5/2010

OTHER PUBLICATIONS

International Search Report and Written Opinion—PCT/US2011/044903—ISA/EPO—Nov. 22, 2011.

* cited by examiner

*Primary Examiner* — Wesley Kim
(74) *Attorney, Agent, or Firm* — Kristine U. Ekwueme (57) ABSTRACT

Certain aspects of the present disclosure relate to a method for efficient measurement and handover of a mobile terminal with multiple USIMs. According to one aspect, a source Node B may initiate calls with first and second subscriber identities associated with a UE that supports multiple subscriber identities and transmit a request for a measurement report to the UE, the request specifying the first subscriber identity. The subscriber identities may be associated with a UE by association with an International Mobile Equipment Identity (IMEI). The source Node B may determine to handover the calls for the first and second subscriber identities to a target Node B based on the measurement report. The source Node B may transmit handover commands to instruct the UE to handover calls for the first and second subscriber identities to the target Node B.

24 Claims, 11 Drawing Sheets

| Handover Command IEs | Description |
|---|---|
| Activation Timer | Indicates frame number when reconfig takes effect. May be same for both IMSIs and set to a value to allow re-transimssion of failed handover command. |
| C-RNTI | C-RNTI for use in target cell. |

1202 — Activation Timer
1204 — C-RNTI

FIG. 12

MEASUREMENT AND HANDOVER OF DUAL USIM MOBILE TERMINAL

CLAIM OF PRIORITY UNDER 35 U.S.C. §119

The present application for patent claims benefit of Provisional Application Ser. No. 61/366,471, filed Jul. 21, 2010, and assigned to the assignee hereof and hereby expressly incorporated by reference herein.

BACKGROUND

1. Field

Aspects of the present disclosure relate generally to wireless communication systems, and more particularly, to measurement and handover procedures for mobile terminals.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method for wireless communications is provided. The method generally includes establishing a first call with a first subscriber identity associated with a single user equipment (UE) that supports multiple subscriber identities, establishing a second call with a second subscriber identity associated with the UE, transmitting a request for a measurement to the UE, receiving, from the UE, a measurement report, deciding, based on the measurement report, to handover the first and second calls with the first and second subscriber identities to a target node B, and transmitting first and second handover commands to instruct the UE to handover the first and second calls with the first and second subscriber identities to the target node B.

In an aspect of the disclosure, an apparatus for wireless communication is provided. The apparatus generally includes means for establishing a first call with a first subscriber identity associated with a single user equipment (UE) that supports multiple subscriber identities, means for establishing a second call with a second subscriber identity associated with the UE, means for transmitting a request for a measurement to the UE, means for receiving, from the UE, a measurement, means for deciding, based on the measurement report, to handover the first and second calls with the first and second subscriber identities to a target node B, and means for transmitting first and second handover commands to instruct the UE to handover the first and second calls with the first and second subscriber identities to the target node B.

In an aspect of the disclosure, a computer program product comprising a computer-readable medium is provided. The computer-readable medium generally comprises code for establishing a first call with a first subscriber identity associated with a single user equipment (UE) that supports multiple subscriber identities, establishing a second call with a second subscriber identity associated with the UE, transmitting a request for a measurement to the UE, receiving, from the UE, a measurement report, deciding, based on the measurement report, to handover the first and second calls with the first and second subscriber identities to a target node B, and transmitting first and second handover commands to instruct the UE to handover the first and second calls with the first and second subscriber identities to the target node B.

In an aspect of the disclosure, an apparatus for wireless communication, comprising at least one processor and a memory coupled to the at least one processor is provided. The at least one processor is generally configured to establish a first call with a first subscriber identity associated with a single user equipment (UE) that supports multiple subscriber identities, establish a second call with a second subscriber identity associated with the UE, transmit a request for a measurement to the UE, receive, from the UE, a measurement report, decide, based on the measurement report, to handover the first and second calls with the first and second subscriber identities to a target node B, and transmit first and second handover commands to instruct the UE to handover the first and second calls with the first and second subscriber identities to the target node B.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
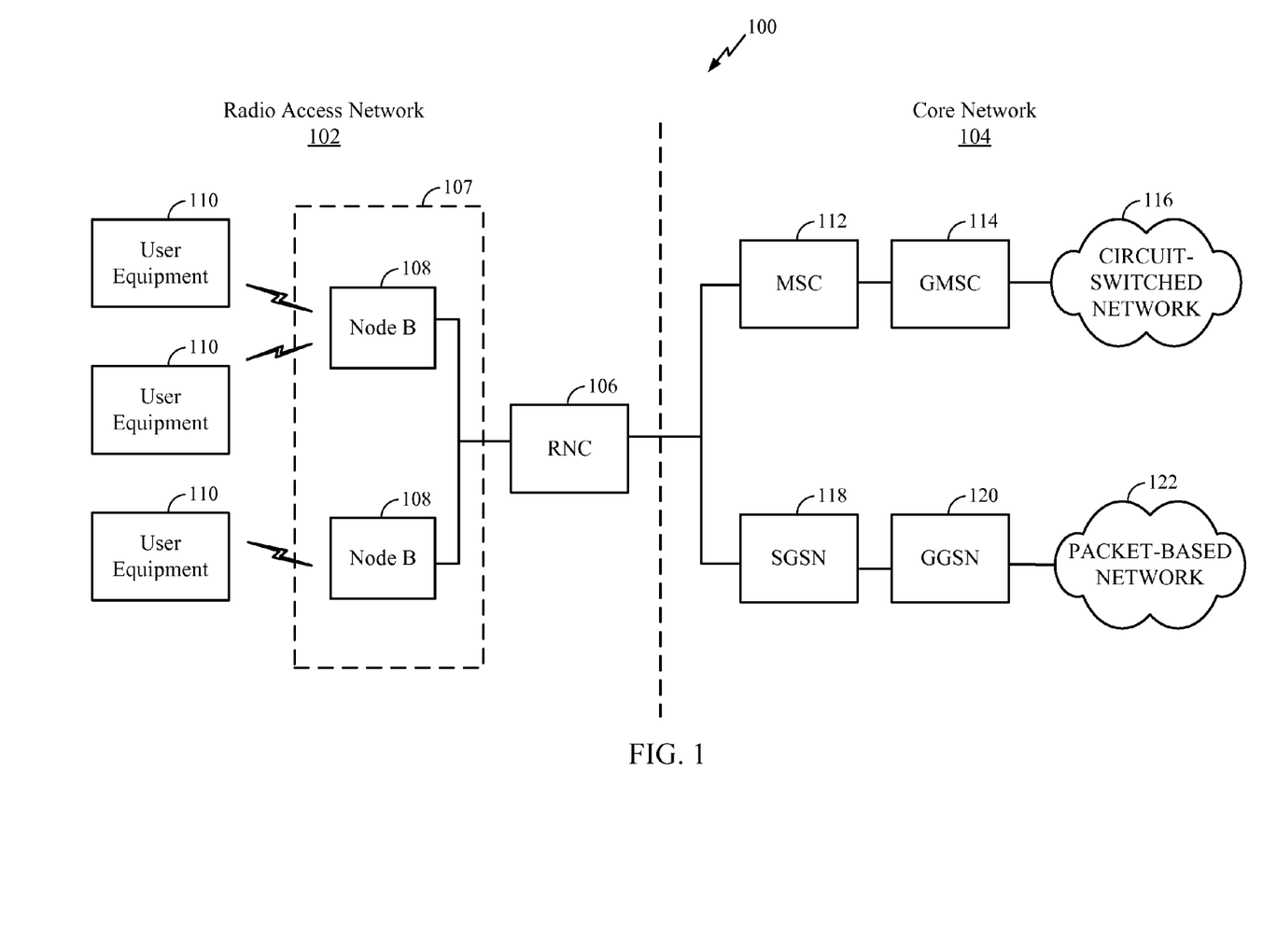
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
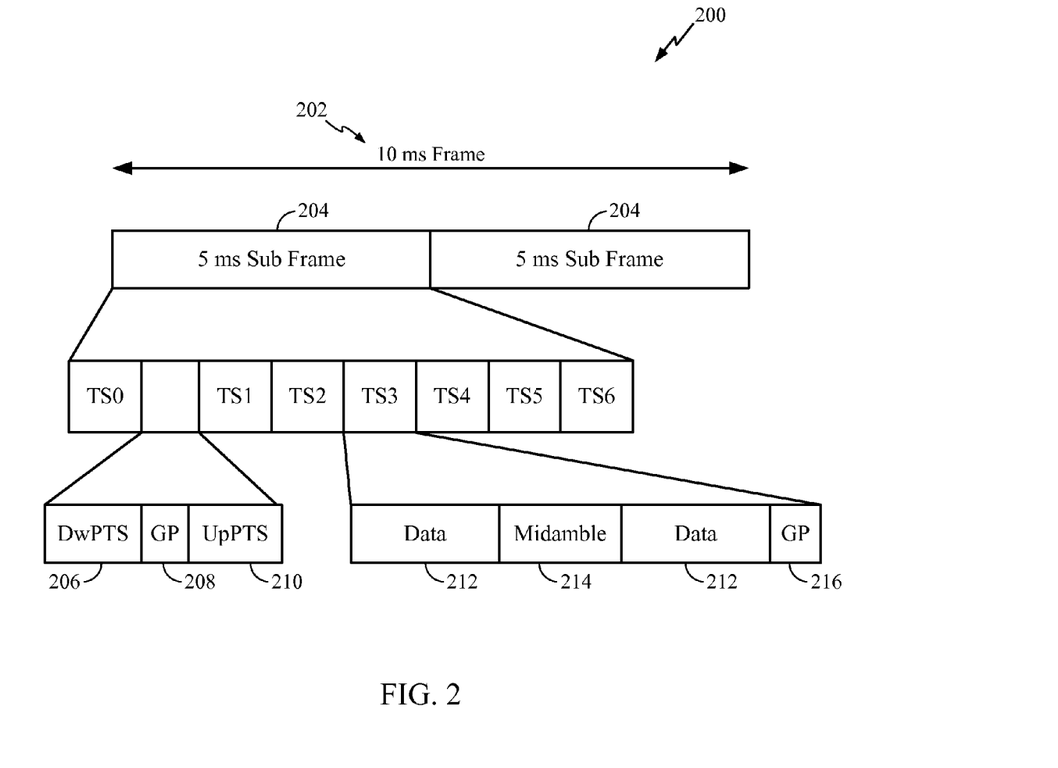
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

According to certain aspects, a UE may register multiple mobile identifiers (e.g., IMSIs) within time slots allocated for uplink communications. A UE may also provide, within time slots allocated for uplink communications, a single measurement report that a base station may utilize to make handover decisions regarding calls for multiple IMSIs. The measurement report may be generated by the UE based on reference signals received in time slots allocated for downlink communications.

Figure 3:
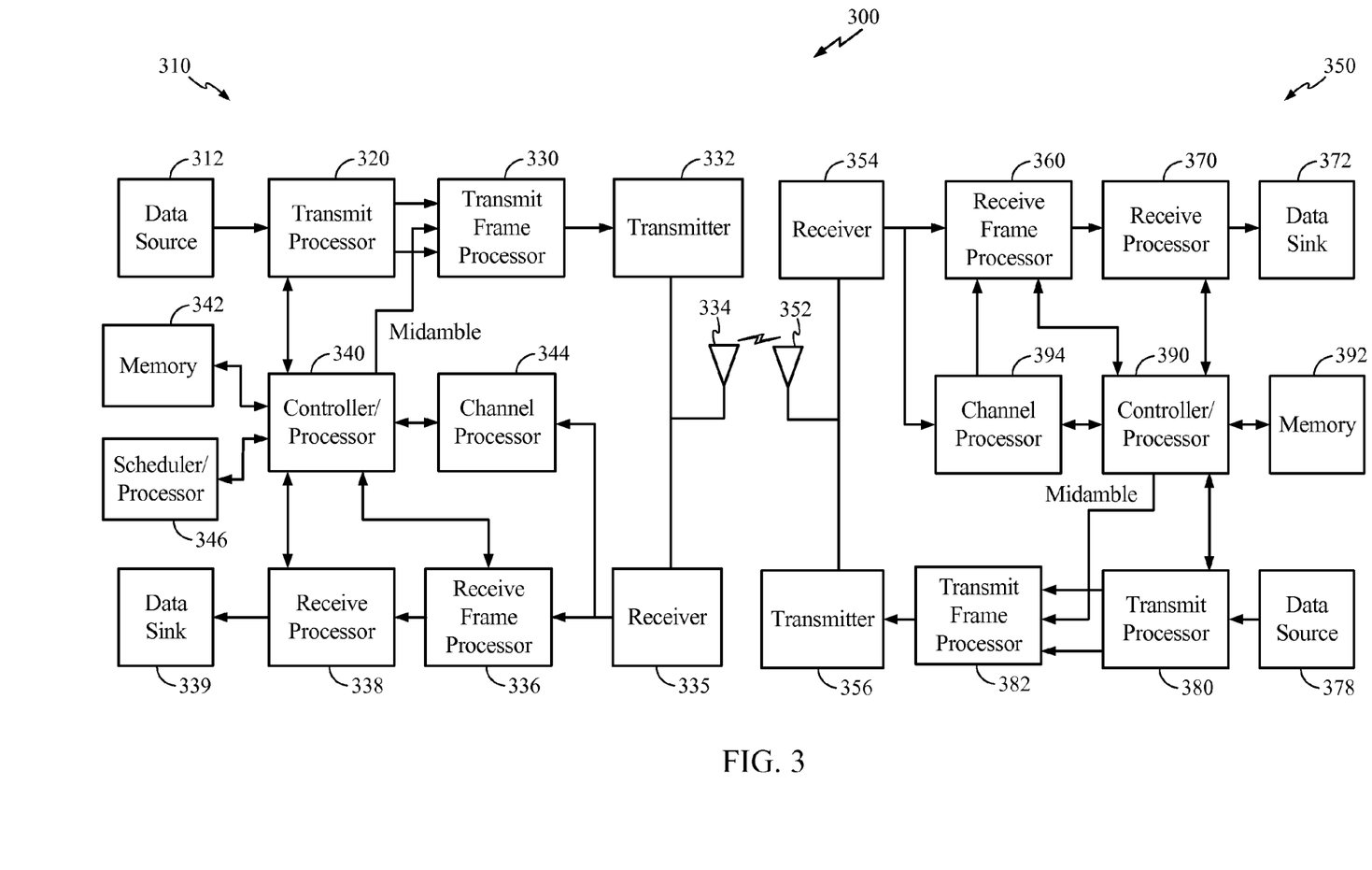
FIG. 3 is a block diagram conceptually illustrating an example of a Node B in communication with a user equipment (UE) in a telecommunications system.

FIG. 3 is a block diagram of a Node B 310 in communication with a UE 350 in a RAN 300. The Node B 310 may be configured to perform operations described herein, for example, receiving a single measurement report and considering the results when making handover decisions for multiple IMSIs of a single UE.

The RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

According to one aspect, the controller/processor 340 direct the Node B 310 to initiate a first call with a first subscriber identity associated with a single UE 350 that supports multiple subscriber identities and initiate a second call with a second subscriber identity associated with the UE. In one aspect, the transmitter 332 may transmit a request for a measurement to the UE, the request specifying the first subscriber identity. In another aspect, the receiver 335 may receive, from the UE 350, a measurement report for the first subscriber identity. In an aspect, the controller/processor 340 may decide, based on the received measurement report, to handover the calls for the first and second subscriber identities to a target node B (not shown). In one aspect, the transmitter 332 may transmit first and second handover commands to instruct the UE 350 to handover the calls for the first and second subscriber identities to the target node B. According to one embodiment, the controller/processor 340 may further perform registration with the UE 350 for the first and second subscriber identities and associate the first and second subscriber identities with the same equipment identity of the UE 350.

Measurement and Handover of Dual USIM Mobile Terminal

In some countries, for example, China, it is popular to have a mobile phone support more than one Universal Subscriber Identity Module (USIM), whereby a user may make a phone call using different phone numbers. Each USIM has a unique International Mobile Subscriber Identity (IMSI), which is used to identify a mobile phone user within a mobile network. In one aspect, an IMSI may be encoded in a smart card inserted into a mobile phone.

Generally, handover procedures may be used by a network where a UE is traveling across a border between a source cell to a target cell. Handover procedures generally are considered to have several steps, as follows: (1) a communicating UE performs a handover measurement; (2) a network makes a handover decision based on the measurement results reported by the UE; and (3) the UE completes the handover operation according to the commands sent from the network. As such, according to one aspect, in the case of a dual USIM UE, where the dual USIMs have on-going calls established, each call may need to perform measurement and handover procedures.

Figure 4:
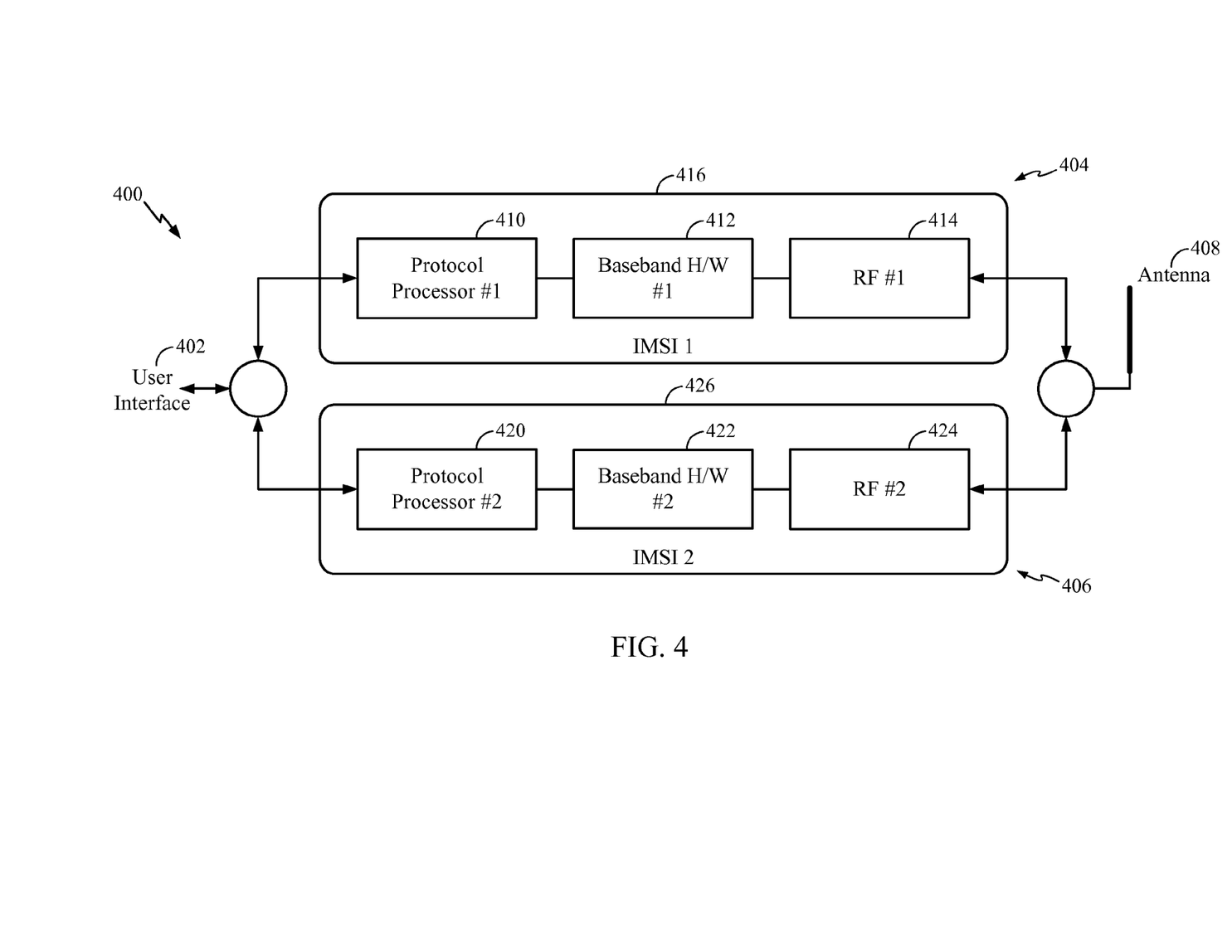
FIG. 4 is a block diagram conceptually illustrating one embodiment of a UE in accordance with aspects of the present disclosure.

FIG. 4 illustrates one embodiment of a hardware configuration that may support dual USIMs. In one embodiment, a hardware configuration may include dual hardware in which two independent radio frequency (RF) hardware, baseband hardware, and protocol processors are used, each for a USIM. For example, a UE 400 may include a user interface 402, a first hardware module 404, a second hardware module 406, and an antenna 408. The hardware modules 404 and 406 may each include a protocol processor 410 and 420, baseband hardware 412 and 422, and RF hardware 414 and 424. The hardware modules 404 and 406 may each support a radio access technology (RAT). For example, hardware module 404 may support TD-SCDMA, and hardware module 406 may support GSM. In one aspect, each separate hardware module 404 and 406 may be dedicated to a single USIM 416 or 426 (denoted in FIG. 4 as "USIM-1" and "USIM-2").

Figure 5:
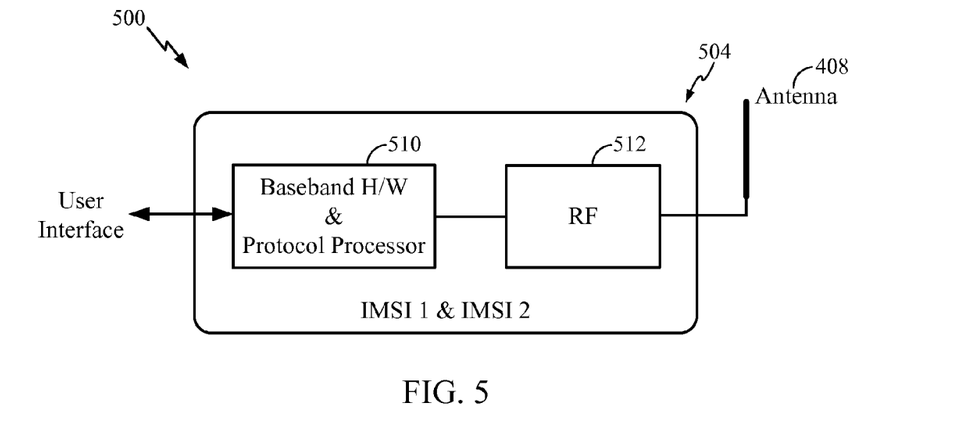
FIG. 5 is a block diagram conceptually illustrating another embodiment of a UE in accordance with aspects of the present disclosure.

FIG. 5 illustrates another embodiment of a hardware configuration that may support dual USIMs. In one embodiment, a single RF hardware, baseband hardware and protocol processor shared by the USIMs. For example, a UE 500 may include a user interface 402, a hardware module 504, and an antenna 408. The hardware module 504 may include a baseband hardware 510, a protocol processor (seen combined with baseband hardware 510), and RF hardware 512. In one aspect, the single RF hardware 512 may transmit and receive with one Node B (NB). The single baseband hardware 510 may process baseband signals simultaneously for both USIMs. The single protocol processor 510 may process both protocol messages and packets simultaneously for both USIMs. In one aspect, since there is one common (RF) hardware for all the calls, there may be some limitation on the UE 500 in connected mode operation although there may still be multiple calls being established for the dual USIMs.

According to one aspect, techniques are provided that allow measurement and handover procedures to be performed more efficiently when there is a single common RF hardware used for the dual SIM configuration, such as the hardware configuration illustrated in FIG. 5.

In one aspect, a measurement control and report may be performed for the dual USIM UE with a shared hardware configuration. Although there may be multiple calls being established for the dual USIMs, there is still one physical UE. Therefore, the network does not need to send measurement control messages to each of the UE identities for performing the measurement and reporting. In one aspect, the network may send one single measurement control and request measurement reporting. The network may know that these calls belong to the same UE by including an association of the IMSI of the USIM and International Mobile Equipment Identity (IMEI) for identifying the UE hardware in the home location register (HLR).

Figure 6:
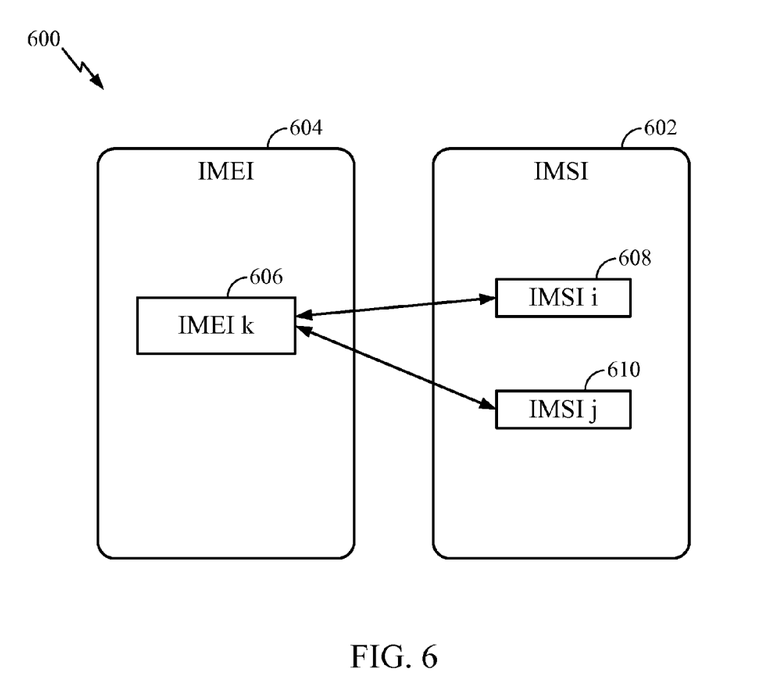
FIG. 6 is a block diagram conceptually illustrating aspects of a UE in accordance with aspect of the present disclosure.

FIG. 6 illustrates a block diagram of an association between IMSIs 602 and an IMEI 604. In one aspect, a first IMSI 608 (denoted as "IMSI i") may be associated with a first IMEI 606 (denoted as "IMEI k"). A second IMSI 610 (denoted as "IMSI j") may further be associated with the first IMEI 606. According to one aspect, upon registration or call setup, the association information may be forwarded to the network, for example, a TD-SCDMA network.

In another aspect, a synchronized handover may be used for the dual USIM UE with a shared hardware configuration. In one aspect, since RF hardware generally must switch to a target NB for all on-going calls, the wireless network may command a UE to handover all the on-going calls for all USIMs at the same time. In one aspect, once the network decides to perform a handover, it may send handover commands simultaneously to the UE. In one aspect, a Node B may transmit PHYSICAL CHANNEL RECONFIGURATION messages to a UE. Furthermore, to avoid message loss and allow retransmission of messages, the network may include a same action time in the message which may allow some time delay for the protocol layer 2 to retransmit any lost handover command messages.

The synchronized handover techniques described herein may also be utilized with UEs that support multiple USIMs with multiple hardware configurations. However, in these cases, the multiple hardware configurations may allow for multiple measurements to be performed, thus there may be less benefit in multiple hardware configurations than in shared hardware configurations.

Figure 7:
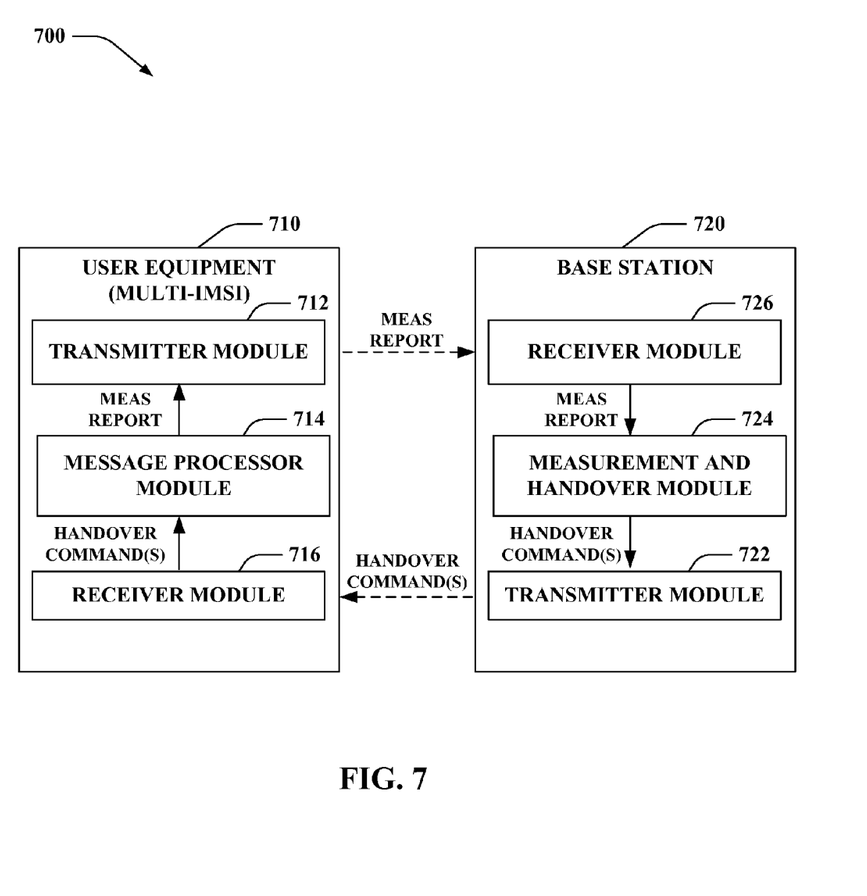
FIG. 7 illustrates example modules for a user equipment and base station capable of performing operations for synchronized handover in accordance with aspects of the present disclosure.

FIG. 7 illustrates an example UE 710 with multiple SIs (USIMs or IMSIs) in communication with a base station 720 that may be capable of performing operations for a synchronized handover. As illustrated, the UE 710 may include a message processor module 714 that may be configured to generate a measurement report. While the measurement report may be for a single IMSI and may be transmitted to the base station 720 via a transmitter module 712.

As illustrated, the base station 720 may include a receiver module 726 that receives the measurement report from the UE 710. The receiver module 726 may provide the measurement report to a measurement and handover module 724 configured to process the measurement report and make handover decisions. While the measurement report may be for a single IMSI, the base station 720 may make a handover decision for multiple IMSIs based on the measurement report.

As illustrated, if the measurement report warrants it, the measurement and handover module 724 may generate one or more handover commands instructing the UE 710 to handover multiple IMSI calls. As illustrated, the measurement and handover module 724 may provide the handover command messages to a transmitter module 722 for transmission to the UE 710. A receiver module 716 at the UE 710 may receive the handover command messages and provide them to the message processing module 714, which may perform appropriate operations for handing over multiple IMSI calls.

Figure 8:
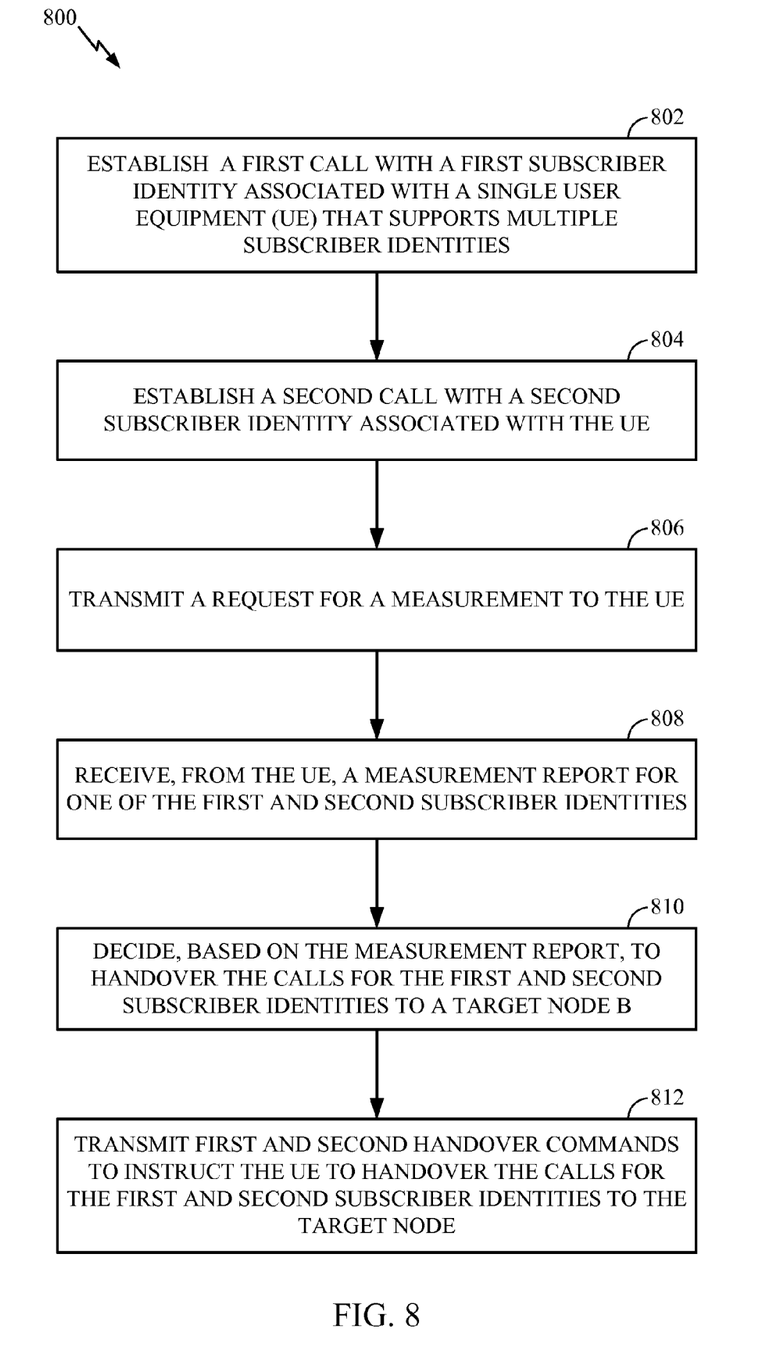
FIG. 8 is a functional block diagram conceptually illustrating example blocks that may be executed by a base station to implement the functional characteristics of one aspect of the present disclosure.

FIG. 8 is a functional block diagram illustrating example operations 800 executed in conducting wireless communication according to one aspect of the present disclosure. In block 802, a Node B may establish a first call with a first subscriber identity (SI) associated with a single UE that supports multiple SIs. The call may be initiated by the network, commonly referred to as a mobile terminated (MT) or initiated by the UE, commonly referred to as a mobile originated (MO) call. In block 804, the Node B may establish a second call with a second SI associated with the UE. In one aspect, the first and second SIs may include an IMSI. In another aspect, the first and second SIs may be associated with an IMEI of the UE.

In block 806, the Node B may transmit a request for measurement to the UE. According to certain aspects, the request may specify the first subscriber identity. Alternatively, the request may simply target the UE and the UE may decide for which IMSI the request is intended. In block 808, the Node B may receive from the UE a measurement report for one of the first and second subscriber identities.

In block 810, the Node B may decide, based on the measurement report received from the UE, to handover the calls for the first and second SIs to a target Node B. In block 812, the Node B may transmit first and second handover commands to instruct the UE to handover the calls for the first and second SIs to the target node. In one aspect, the first and second handover commands may be transmitted at a same time and may include a common action time.

According to an aspect of the invention, the Node B may further perform registration with the UE for the first and second subscriber identities. The Node B may also associate the first and second subscriber identities with the same equipment identity of the UE.

Figure 9:
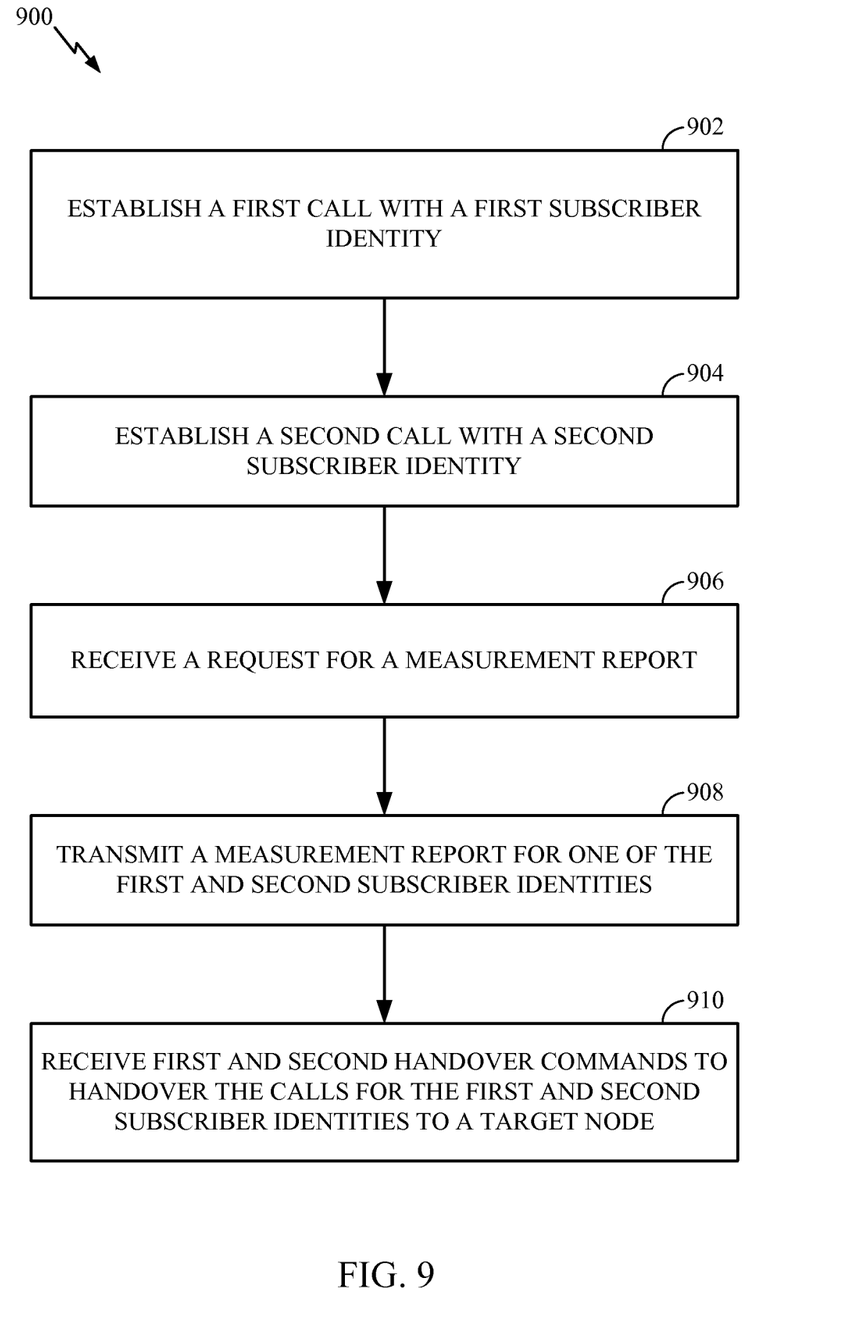
FIG. 9 is a functional block diagram conceptually illustrating example blocks that may be executed by a user equipment to implement the functional characteristics of one aspect of the present disclosure.

FIG. 9 illustrates example operations 900, corresponding to the example operations 800, but from a UE perspective. The operations 900 begin, at 902 and 904, by establishing first and second calls with first and second subscriber identities. As noted above, the calls may be mobile originated, mobile terminated, or a combination of the two. At 906, the UE receives a request for measurement report. As noted above, the request may specify a single subscriber identity (e.g., a first IMSI) or, alternatively, the UE. In any case, at 908, the UE may transmit a single measurement report for one of the first and second subscriber identities back to the base station. At 910, the UE may receive first and second handover commands to handover the calls for the first and second subscriber identities to a target node.

Figure 10:
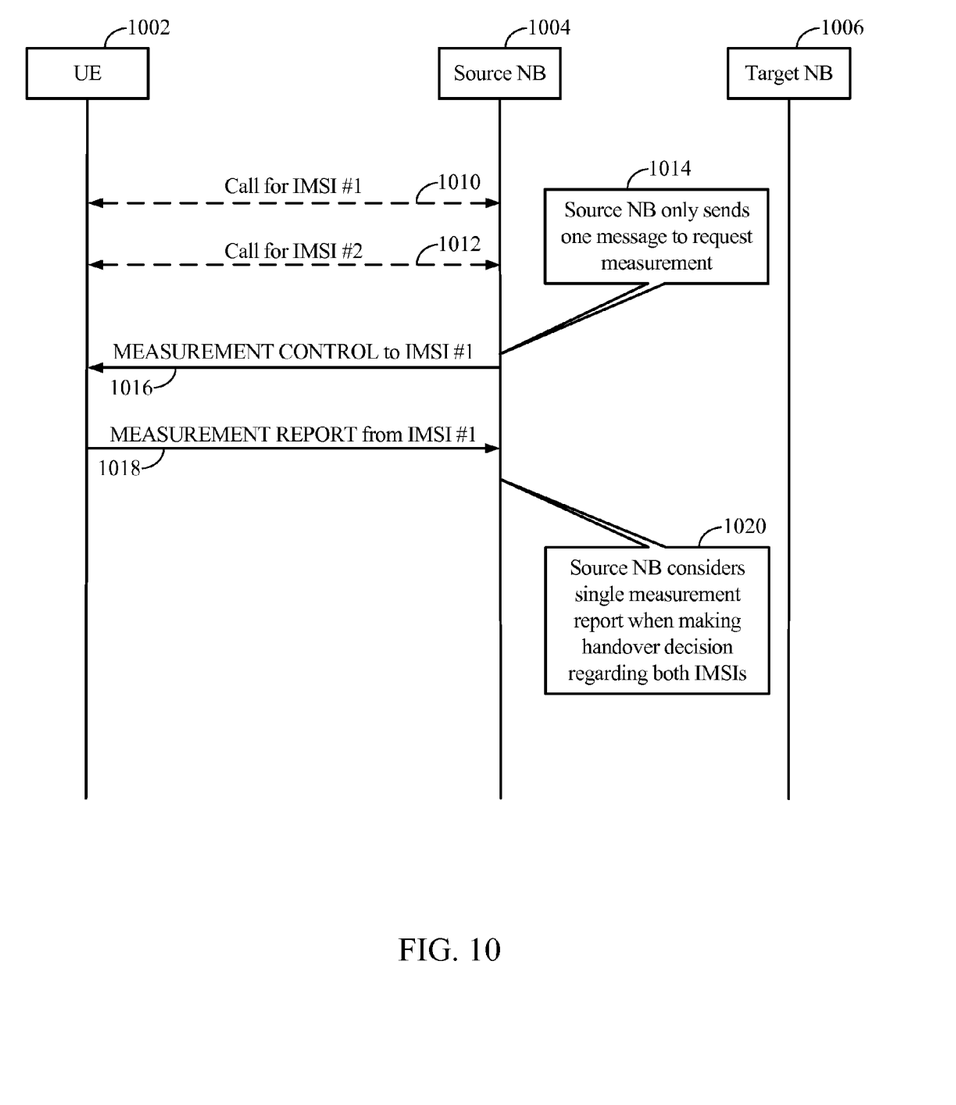
FIGS. 10 and 11 are sequence diagrams illustrating an example of synchronized handover in accordance with aspects of the present disclosure.

FIG. 10 is a sequence "call flow" diagram illustrating an exemplary exchange of messages, corresponding to the operations shown in FIGS. 8 and 9, in accordance with aspects of the present disclosure. According to one aspect, a source Node B 1004 may perform the exemplary operations with a UE 1002 and a target Node B 1006 in a wireless network. At 1010 and 1012, calls may be established with the UE 1002 for first IMSI and a second IMSI using the source Node B 1004. As noted in block 1014, in one aspect, the source NB may send only one message to request measurement. For example, the source NB 1004 may send a measurement control at 1016 specifying a single subscriber identity (in the illustrated example, IMSI #1).

At 1018, the source NB receives a measurement report for IMSI #1 from the UE. In one aspect, the source NB may determine based on the measurement report for IMSI #1 to handover the calls for IMSI #1 and IMSI #2 to the target NB 806. In another aspect, the source NB may transmit a first and a second handover commands to instruct the UE to handover calls for IMSI #1 and IMSI #2 to the target NB 806. As noted at 1020, the Source NB may consider the single measurement report when making handover decision regarding both IMSIs.

Figure 11:
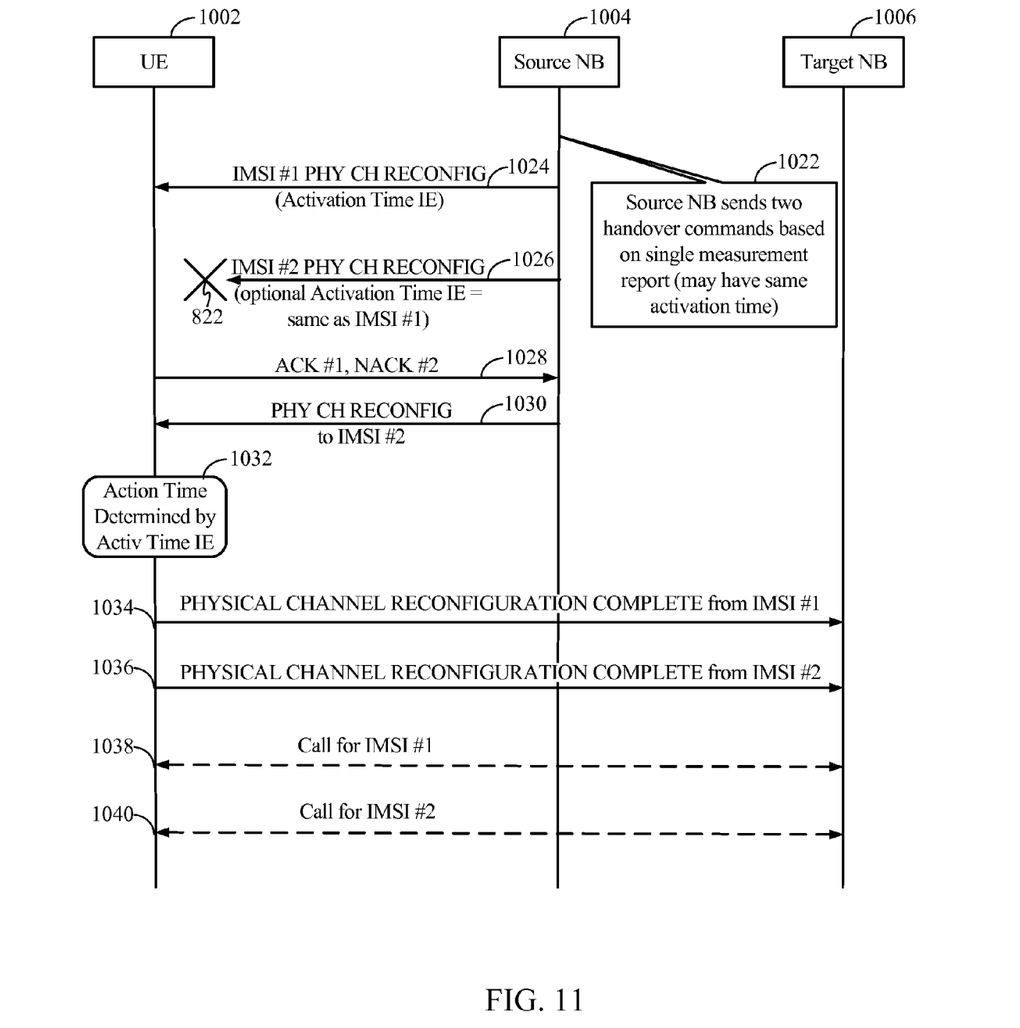

FIG. 11 illustrates a scenario in which the source NB 1004 performs a synchronized handover, for example, if the measurement report indicates a handover to the target NB 1006 would be beneficial. As noted at 1022, the source NB 1004 may send two handover commands (e.g., Physical Channel Reconfiguration Messages) at 1024 and 1026, each targeting a different IMSI. According to certain aspects, the handover commands may have activation time information elements (IEs). By setting these activation time IEs to the same value, the handovers for both IMSIs may be synchronized (e.g., occur in the same frame). The activation time IEs may also be set to a value that allows some time delay for a protocol layer 2 or other signaling means to retransmit any lost handover command messages, such as that indicated by the X with the first handover command for IMSI #2. The UE may send a NACK to indicate the second handover message was not successfully received, prompting a retransmission, at 1030. As noted at 1032, at the action time determined by the Activation Time IEs, the UE may perform a handover procedure to hand over calls for IMSI #1 and IMSI #2 to the target NB 1006. As illustrated, the UE may transmit, at 1034 and 1036, a first "physical channel reconfiguration complete" message for IMSI #1 and a second "physical channel reconfiguration complete" message for IMSI #2 to indicate completion of the handover process. At 1038 and 1040, the UE may continue the calls for IMSI #1 and IMSI #2 using the target NB.

Figure 12:
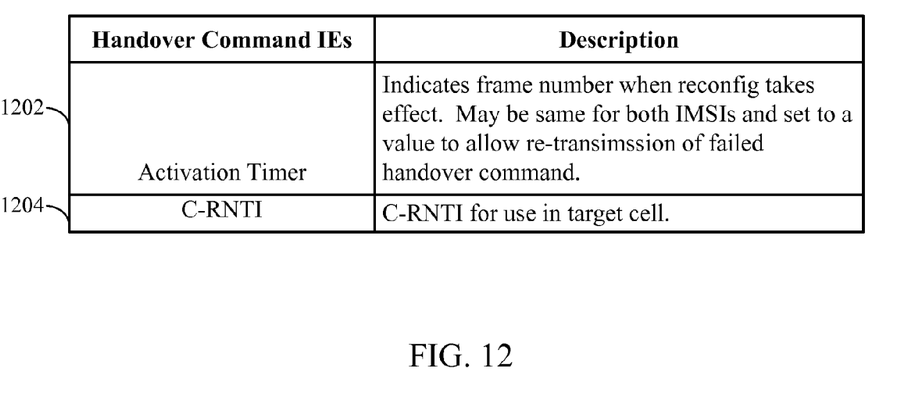
FIG. 12 illustrates example information elements (IEs) that may be provided in a handover command, in accordance with aspects of the present disclosure.

As illustrated in FIG. 12, according to certain aspects, a handover command may include various IEs. As noted above, Activation Timer IE 1202 may indicate a frame number when the reconfiguration (handover to the target NB) takes effect. The Activation Timer IE 1202 may be same for both IMSIs and set to a value to allow re-transmission of failed handover command. According to certain aspects, the handover command may also include a Cell Radio Network Temporary Identifier (C-RNTI) 1204.

In one configuration, the apparatus 310 for wireless communication includes means for initiating first and second calls with first and second subscriber identities associated with a single UE that supports multiple subscriber identities. The apparatus 310 may further include means for transmitting a request for a measurement to the UE, the request specifying the first subscriber identity; receiving, from the UE, a measurement report for the first subscriber identity; deciding, based on the measurement report, to handover the calls for the first and second subscriber identities to a target node B; and transmitting first and second handover commands to instruct the UE to handover the calls for the first and second subscriber identities to the target node B. In one aspect, the aforementioned means may be the processor(s) 340 configured to perform the functions recited by the aforementioned means. In another aspect, the aforementioned means may be a module or any apparatus configured to perform the functions recited by the aforementioned means.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   establishing a first call with a first subscriber identity associated with a single user equipment (UE) that supports multiple subscriber identities;
   establishing a second call with a second subscriber identity associated with the UE;
   transmitting a request for a measurement report to the UE;
   receiving, from the UE, a measurement report;
   deciding, based on the measurement report, to handover the first and second calls with the first and second subscriber identities to a target node B; and
   transmitting first and second handover commands to instruct the UE to handover the first and second calls with the first and second subscriber identities to the target node B.

2. The method of claim 1, wherein the request for measurement report specifies the first subscriber identity.

3. The method of claim 1, wherein the first and second handover commands are transmitted at a same time and include a common action time.

4. The method of claim 1, further comprising:
   performing registration with the UE for the first and second subscriber identities; and
   associating the first and second subscriber identities with the same equipment identity of the UE.

5. The method of claim 4, wherein the equipment identity of the UE comprises an International Mobile Equipment Identity (IMEI).

6. The method of claim 1, wherein each of the first and second subscriber identities comprise an International Mobile Subscriber Identity (IMSI).

7. An apparatus for wireless communication, comprising:
   means for establishing a first call with a first subscriber identity associated with a single user equipment (UE) that supports multiple subscriber identities;
   means for establishing a second call with a second subscriber identity associated with the UE;
   means for transmitting a request for a measurement to the UE;
   means for receiving, from the UE, a measurement report;
   means for deciding, based on the measurement report, to handover the first and second calls with the first and second subscriber identities to a target node B; and
   means for transmitting first and second handover commands to instruct the UE to handover the first and second calls with the first and second subscriber identities to the target node B.

8. The apparatus of claim 7, wherein the request for measurement report specifies the first subscriber identity.

9. The apparatus of claim 7, wherein the first and second handover commands are transmitted at a same time and include a common action time.

10. The apparatus of claim 7, further comprising:
    means for performing registration with the UE for the first and second subscriber identities; and
    means for associating the first and second subscriber identities with the same equipment identity of the UE.

11. The apparatus of claim 10, wherein the equipment identity of the UE comprises an International Mobile Equipment Identity (IMEI).

12. The apparatus of claim 7, wherein each of the first and second subscriber identities comprise an International Mobile Subscriber Identity (IMSI).

13. A computer program product, comprising:
    a non-transitory computer-readable medium comprising code for:
       establishing a first call with a first subscriber identity associated with a single user equipment (UE) that supports multiple subscriber identities;
       establishing a second call with a second subscriber identity associated with the UE;
       transmitting a request for a measurement to the UE;
       receiving, from the UE, a measurement report;
       deciding, based on the measurement report, to handover the first and second calls with the first and second subscriber identities to a target node B; and
       transmitting first and second handover commands to instruct the UE to handover the first and second calls with the first and second subscriber identities to the target node B.

14. The computer program product of claim 13, wherein the request for measurement report specifies the first subscriber identity.

15. The computer program product of claim 13, wherein the first and second handover commands are transmitted at a same time and include a common action time.

16. The computer program product of claim 13, wherein the code further comprises code for:
    performing registration with the UE for the first and second subscriber identities; and
    associating the first and second subscriber identities with the same equipment identity of the UE.

17. The computer program product of claim 16, wherein the equipment identity of the UE comprises an International Mobile Equipment Identity (IMEI).

18. The computer program product of claim 13, wherein each of the first and second subscriber identities comprise an International Mobile Subscriber Identity (IMSI).

19. An apparatus for wireless communication, comprising:
    at least one processor; and
    a memory coupled to the at least one processor,
    wherein the at least one processor is configured to:
       establish a first call with a first subscriber identity associated with a single user equipment (UE) that supports multiple subscriber identities;
       establish a second call with a second subscriber identity associated with the UE;
       transmit a request for a measurement to the UE;
       receive, from the UE, a measurement report;
       decide, based on the measurement report, to handover the first and second calls with the first and second subscriber identities to a target node B; and
       transmit first and second handover commands to instruct the UE to handover the first and second calls with the first and second subscriber identities to the target node B.

20. The apparatus of claim 19, wherein the request for measurement report specifies the first subscriber identity.

21. The apparatus of claim 19, wherein the first and second handover commands are transmitted at a same time and include a common action time.

22. The apparatus of claim 19, wherein the processor is further configured to:
    perform registration with the UE for the first and second subscriber identities; and
    associate the first and second subscriber identities with the same equipment identity of the UE.

23. The apparatus of claim 22, wherein the equipment identity of the UE comprises an International Mobile Equipment Identity (IMEI).

24. The apparatus of claim 19, wherein each of the first and second subscriber identities comprise an International Mobile Subscriber Identity (IMSI).

\* \* \* \* \*